July 11, 1967   J. P. HOCKER   3,330,940
TEMPERATURE CONTROL CIRCUITS
Filed June 22, 1964
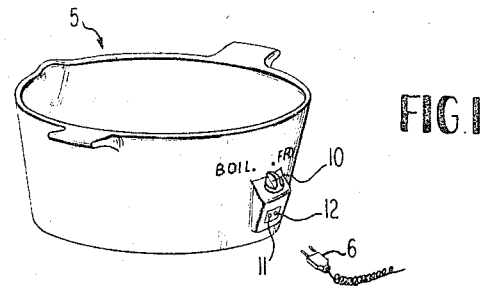
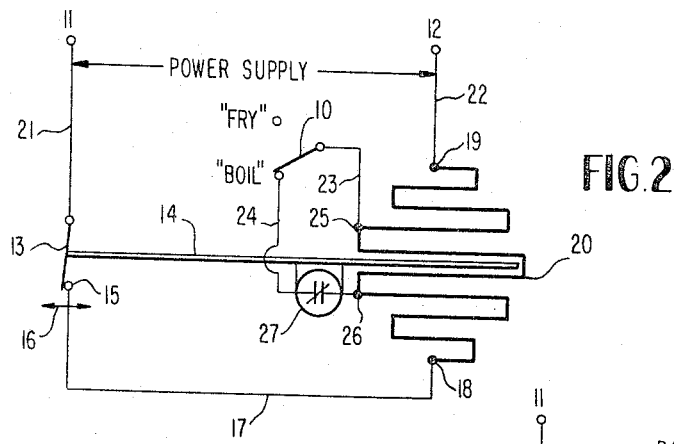
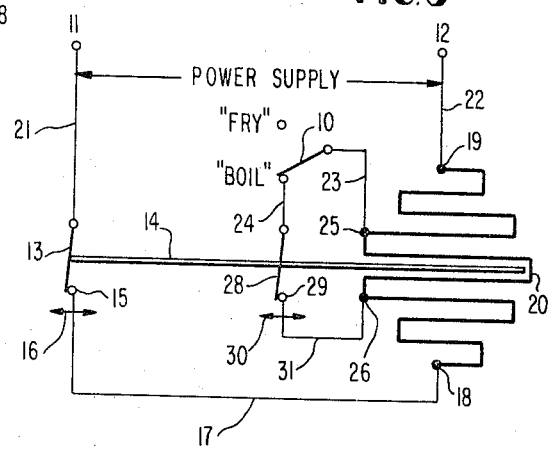
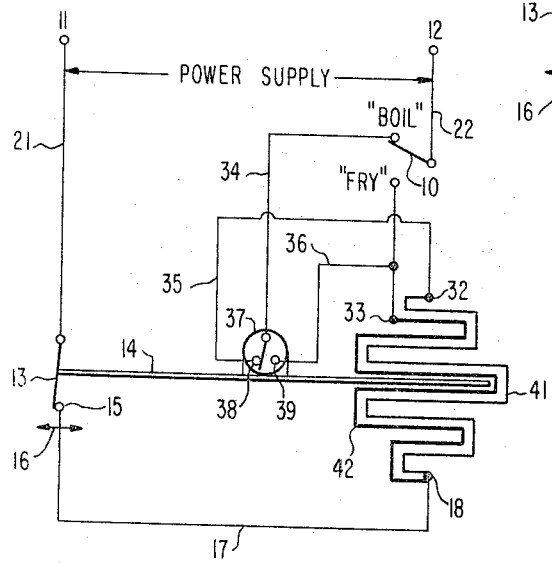
INVENTOR.
JAMES P. HOCKER
BY
Sughrue, Rothwell, Mion & Zinn
ATTORNEYS United States Patent Office 3,330,940
Patented July 11, 1967

3,330,940
TEMPERATURE CONTROL CIRCUITS
James P. Hocker, Corning, N.Y., assignor to Corning Glass Works, Corning, N.Y., a corporation of New York
Filed June 22, 1964, Ser. No. 376,908
13 Claims. (Cl. 219—489)

The invention relates to temperature control circuits for cooking vessels. More specifically, the invention relates to temperature control circuits having more than one degree of sensitivity and therefore useful for cooking operations which require different degrees of sensitivity.

Electrically heated cooking vessels having temperature controls therein are widely used for frying, boiling, baking, broiling, and other cooking operations. In electrical cooking vessels which are to be used for purposes of both boiling and frying, opposing factors come into play.

The most desirable characteristics to control frying operations are uniform distribution of the heat source over the cooking surface for temperature uniformity and relatively large element sensitivity for the temperature sensing device, to avoid temperature overshoot. These characteristics have been provided in the prior art devices by evenly distributing the heating element over the surface of the cooking vessel and adjusting the temperature sensing device for high sensitivity.

In boiling operations, full power should be maintained until boiling is reached. The maintenance of full power requires that the sensor be much less sensitive to the heating element. At the same time, uniform distribution of the heating element is not needed since convection currents maintain uniform temperature in the load.

Due to the differences in requirements for boiling operations and frying operations, electrical cooking vessels which have been designed for one type of cooking have not been adequate for the other type of cooking. It is therefore an object of the present invention to provide an electrical cooking vessel able to meet the requirements of boiling and frying operations.

It is a further object of the invention to provide a temperature controlled heating system having two degrees of temperature sensitivity.

In accordance with the present invention, an electrical cooking vessel is provided with a heating element which is evenly distributed beneath the cooker surface. A first temperature sensitive switch is maintained highly sensitive to the heating element throughout the frying operation by causing the heating element adjacent the sensor to be energized. This results in the sensor closely tracking the heating element in temperature and prevents overshoot.

For boiling operations, a second temperature switch is maintained at a low sensitivity by causing only a portion of the heating element to be energized. The portion which is not energized is that which is adjacent the sensor. Thus, a greater amount of heat will be generated in the boiling operation before the sensor reaches a high enough temperature to switch or open the second temperature sensitive switch. After the second temperature sensitive switch opens, the total heating element becomes energized and the first temperature sensitive switch takes over.

The invention and other objects thereof will be more readily apparent from a reading of the detailed description of the following drawings, wherein:

FIGURE 1 is a perspective view of an electrically operated vessel having switch means for controlling a circuit in accordance with the invention;

FIGURES 2, 3, and 4 are wiring diagrams showing embodiments of temperature controlled circuits in accordance with the invention.

In FIGURE 1, there is shown a cooking vessel 5 operable to be electrically controlled for boiling or frying operations. A boil-fry selector switch 10 is provided for manually selecting the type of operation desired. Numeral 6 generally designates a power supply lead adapted to be connected to contacts 11 and 12 on the cooking vessel 5.

Referring to FIGURE 2, there is shown a heating element 20 which may consist of a folded resistance alloy ribbon. Heating element 20 is uniformly distributed beneath the surface of cooker 5. End 19 of heating element 20 is connected to the power supply by way of lead 22. End 18 of heating element 20 is connected to the power supply via lead 17, adjustable switch 13, and lead 21. A boil-fry selector switch 10 is connected to heating element 20 at point 25 via lead 23. Selector switch 10 has two terminals, a fry position terminal and a boil position terminal. The boil position terminal is connected to heating element 20 at point 26 via lead 24 and disc-type thermostat 27. Disc-type thermostat 27 is connected to thermostatic expansion rod 14 which is located adjacent the center portion of heating element 20. Thermostatic expansion rod 14 is also connected to adjustable switch 13.

The circuit shown in FIGURE 2 operates in the following manner: For frying operations, selector switch 10 is switched to the fry terminal, and adjustable switch 13 is regulated by adjustment 16 so as to respond to any desired temperature. Since the selector switch 10 is in the fry position, heating element 20 will be entirely energized as long as adjustable switch 13 remains closed. Since the entire heating element 20 is energized, the heat is evenly distributed over the surface of the cooking vessel and thermostatic expansion rod 14 is highly sensitive to the temperature of heating element 20. During this operation, control rod 14 acts to open and close switch 13 thus maintaining the temperature at the desired level throughout the entire frying operation. Switch 13, when open, removes the entire heating element 20 from the power supply.

For boiling operations, selector switch 10 is connected to the boil terminal, and switch 13 is again adjusted to the maximum temperature level. When selector switch 10 is in the boil position, as shown, the center portion of heating element 20, between points 25 and 26, is short circuited by means of lead 23, selector switch 10, lead 24, and disc-type thermostat 27. In this position of the selector switch, the heating element which is energized is not evenly distributed over the cooking surface, and since a portion of the heating element is not energized the power is somewhat increased. Disc-type thermostat 27, which is the low sensitive temperature sensor, is connected to sense the temperature of control rod 14. When control rod 14 reaches a predetermined temperature, disc thermostat 27 opens and thus removes the short circuit from the center portion of heating element 20. Heating element 20 becomes entirely energized, and the high sensitivity temperature switch 13 is now operable to maintain a particular rate of boiling.

The temperature controlled circuit of FIGURE 3 is identical to that shown in FIGURE 2, and the operation is the same, excepting that in FIGURE 3 a variable switch 28 is substituted for the disc-type thermostat switch 27. Switch 28 is of the same type as switch 13, and responds to the expansion of control rod 14. Arrow 30 indicates that switch 28 is adjustable. The adjustment may be used to compensate for load size so that the switch opens when boiling begins in all cases. Once switches 27, FIGURE 2, and 28, FIGURE 3, are opened, they remain open throughout the remainder of the boiling operation since control rod 14 is now responding to the entire heating element and it is therefore maintained at a temperature high enough to keep the low sensitive switches open.

In FIGURE 4, two heating elements are used. The circuit includes heating element 42 which is located adjacent the control rod 14, and energized throughout the frying operation and during the boiling operation once boiling has been reached. The circuit also includes a heating element 41 which is energized during the boiling operation until boiling is reached.

In FIGURE 4, for frying operations, the power supply is connected to point 33 of heating element 42 via lead 22 and selector switch 10. Point 18 of heating element 42 is connected to the power supply via lead 17, contact 15, high-sensitive switch 13, and lead 21. Control rod 14 is responsive to the energized heating element 42, and acts in conjunction with switch 13 to maintain the temperature at specified level during frying operations.

At the start of boiling operations, point 32 of heating element 41 is connected to the power supply via lead 35, contact 38 of double-throw thermostat switch 37, lead 34, switch 10 and lead 22. Double-throw thermostat switch 37 is operative to switch positions and connect lead 34 to lead 36 when control rod 14 reaches a predetermined temperature. The predetermined temperature is that at which the load in the cooking vessel will boil. When thermostat 37 switches to contact 39, heating element 41 is de-energized and heating element 42 is energized. The energization of heating element 42 maintains the control rod at a temperature above that which is necessary to switch thermostat 37 to contact 39, and thus heating element 42 remains in the circuit throughout the remainder of the boiling operation. Switch 13 in conjunction with rod 14 now maintains boiling at a specified level.

The above described figures are only illustrative of circuits which embody the concept of the invention. Variations of the circuits shown will be obvious to those skilled in the art, and are intended to be well within the scope of the invention. It should be further understood that although the figures show only two degrees of sensitivity, other circuits employing three or even more also come within the scope of this invention which is deemed to be limited only by the following claims.

I claim:
1. In an electrical cooking vessel,
 (a) a first heating circuit generating a first heat power output,
 (b) a second heating circuit for generating a second heat power output,
 (c) a pair of power supply terminals,
 (d) a manual switch for initially connecting one of said first and second heating circuits to said pair of power supply terminals, and
 (e) means in said first heating circuit responsive to a predetermined temperature generated by the operation of said first heating circuit for disconnecting said first heating circuit from said power supply terminals and connecting said second heating circuit to said power supply terminals.

2. A controlled heating system capable of being energized by a power supply, comprising
 (a) a heating element having first and second portions,
 (b) means for connecting said heating element to said power supply,
 (c) a manual switch, having first and second positions, for removing said first portion from connection to said power supply when said manual switch is in said first position,
 (d) a temperature-sensitive means for automatically disconnecting said entire heating element from said power supply, and
 (e) an automatic switch enabled when said manual switch is in its first position and responsive to the temperature of said second portion of said heating element for reconnecting said first portion to said power supply.

3. The system as claimed in claim 2 wherein said means for automatically disconnecting comprises a thermostatic expansion rod and a contact switch controlled by the expansion of said thermostatic expansion rod.

4. The system as claimed in claim 3 wherein said rod has a portion positioned adjacent to the first portion of said heating element and is responsive to said heating element for opening said contact switch only when said first portion is energized.

5. A controlled heating system capable of being energized by a power supply comprising:
 (a) a heating element,
 (b) means for connecting said heating element to said power supply,
 (c) a thermostatic expansion rod having a portion thereof adjacent the center portion of said heating element,
 (d) a contact switch controlled by the expansion of said rod for disconnecting said heating element from said power supply,
 (e) a circuit for controlling the sensitivity of said system comprising a manual switch having first and second positions,
 (f) means for connecting said circuit in parallel with a portion of said heating element when said manual switch is in a first position, and
 (g) an automatic temperature sensitive switch in said circuit for opening said circuit when the temperature of said heating element passes a predetermined level.

6. The system as claimed in claim 5 wherein said rod controls said contact switch only when said portion of said heating element is not in parallel with said circuit.

7. The system as claimed in claim 6 wherein said heating element is a folded resistance alloy ribbon.

8. The system as claimed in claim 6 wherein said automatic switch is a thermostat, responsive to the temperature of said rod.

9. The system as claimed in claim 6 wherein said automatic switch is controlled by the expansion of said rod.

10. The system as claimed in claim 6 wherein said contact switch includes an adjustable contact for adjusting the amount of expansion of said rod necessary to open said contact switch.

11. The system as claimed in claim 10 wherein said automatic switch includes an adjustable contact for changing said predetermined level.

12. A controlled heating system capable of being energized by a power supply, comprising:
 (a) a heating element including first and second heating ribbons,
 (b) a thermostatic expansion rod having one end adjacent to said first ribbon,
 (c) a double-throw thermostat switch,
 (d) a manual switch having a first position for connecting said first ribbon to said power supply and a second position for connecting said thermostat switch to said power supply,
 (e) said thermostat switch having a first position for connecting said second ribbon to said power supply, and a second position for connecting said first ribbon to said power supply, (f) means for causing said thermostat switch to switch from said first position to said second position when said thermostatic expansion rod reaches a predetermined temperature, and (g) a contact switch controlled by said thermostatic rod for disconnecting said power supply from said heating system.

13. The system as claimed in claim 12 wherein said contact switch is adjustable.

References Cited

UNITED STATES PATENTS

| 1,077,372 | 11/1913 | Shaler | 219—252 |
| 2,385,606 | 9/1945 | Campbell | 219—252 |
| 2,610,283 | 9/1952 | Kolisch | 219—441 |

RICHARD M. WOOD, *Primary Examiner.*

L. H. BENDER, *Assistant Examiner.*